(12) United States Patent
Kase et al.

(10) Patent No.: US 6,873,508 B2
(45) Date of Patent: Mar. 29, 2005

(54) PROTECTIVE RELAY SYSTEM

(75) Inventors: Takahiro Kase, Tachikawa (JP); Hidenari Amo, Fuchu (JP); Yasutaka Sonobe, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 375 days.

(21) Appl. No.: 10/227,487

(22) Filed: Aug. 26, 2002

(65) Prior Publication Data

US 2003/0039086 A1 Feb. 27, 2003

(30) Foreign Application Priority Data

Aug. 27, 2001 (JP) ........................................ 2001-255527

(51) Int. Cl.$^7$ ................................................ H02H 3/18
(52) U.S. Cl. ...................................................... 361/80
(58) Field of Search ............................. 361/66, 69, 80, 361/81, 115

(56) References Cited

U.S. PATENT DOCUMENTS

| | | | | |
|---|---|---|---|---|
| 3,732,464 A | * | 5/1973 | Miki et al. ..................... | 361/80 |
| 4,308,565 A | * | 12/1981 | de Mesmaeker et al. ..... | 361/80 |
| 4,321,681 A | * | 3/1982 | Sackin et al. ................ | 700/293 |
| 4,327,392 A | * | 4/1982 | Souillard ...................... | 361/80 |
| 4,453,191 A | | 6/1984 | Wilkinson .................... | 361/84 |
| 4,591,992 A | * | 5/1986 | Yamaura ....................... | 702/59 |
| 4,686,601 A | * | 8/1987 | Alexander et al. ............ | 361/80 |
| 4,825,327 A | * | 4/1989 | Alexander et al. ............ | 361/82 |
| 4,896,241 A | | 1/1990 | Li et al. ........................ | 361/66 |
| 5,349,490 A | | 9/1994 | Roberts et al. ................ | 361/80 |
| 5,808,845 A | * | 9/1998 | Roberts ........................ | 361/79 |
| 5,946,174 A | * | 8/1999 | Kaiser ......................... | 361/47 |
| 6,369,996 B1 | * | 4/2002 | Bo ............................... | 361/80 |
| 6,459,960 B1 | * | 10/2002 | Shuto et al. ................. | 700/293 |

FOREIGN PATENT DOCUMENTS

| | | |
|---|---|---|
| JP | 64-6608 | 2/1989 |
| JP | 10-322887 | 12/1998 |
| JP | 2001-54233 | 2/2001 |

OTHER PUBLICATIONS

"Electric Technology Research Association Report", vol. 37-1 (No Date).

* cited by examiner

Primary Examiner—Brian Sircus
Assistant Examiner—Boris Benenson
(74) Attorney, Agent, or Firm—Oblon, Spivak, McClelland, Maier & Neustadt, P.C.

(57) ABSTRACT

In a protective relay system according to an aspect of the present invention, a direction of a fault is correctly determined during system oscillation using one of a negative-phase-sequence relay and a zero-phase-sequence relay. A circuit breaker is tripped only when an internal fault is determined at both terminals to be protected using a carrier signal. Thus, even though a fault occurs during system oscillation, the circuit breaker can be tripped against the internal fault.

17 Claims, 12 Drawing Sheets

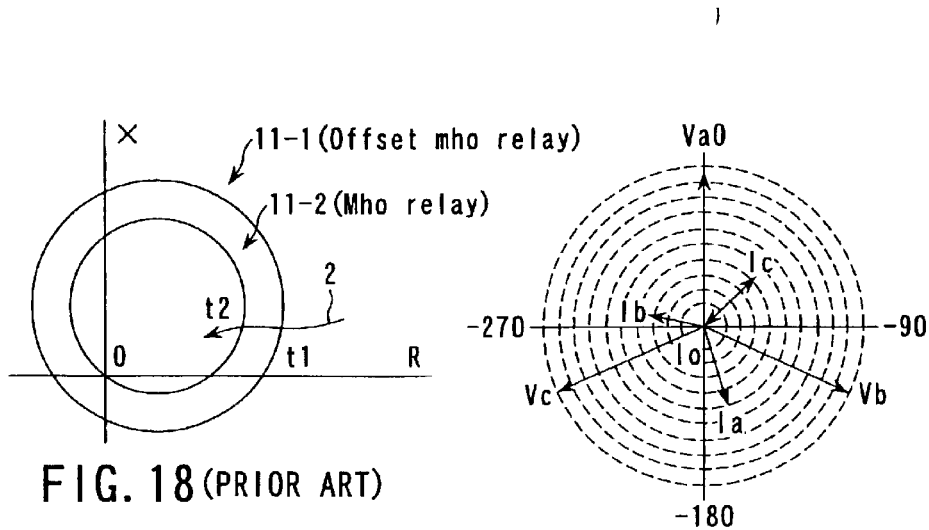
FIG. 18 (PRIOR ART)
FIG. 20A (PRIOR ART)
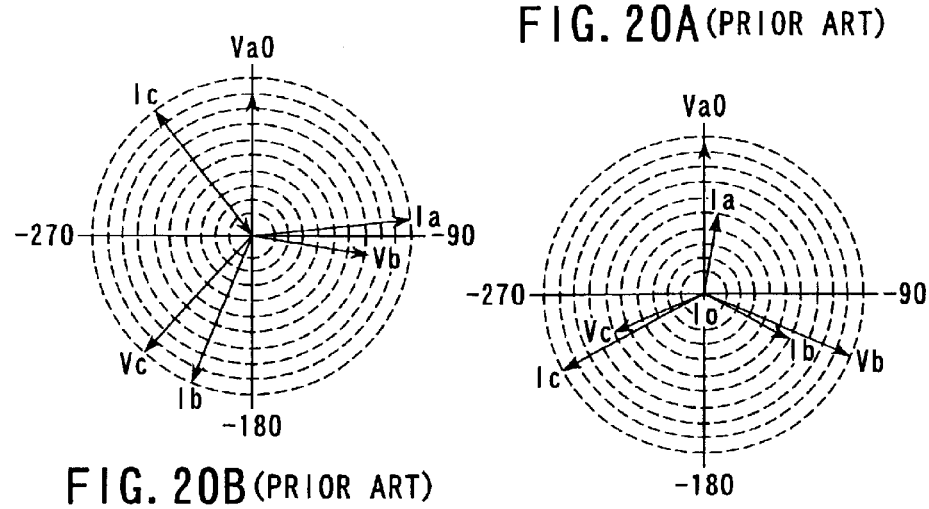
FIG. 20B (PRIOR ART)
FIG. 20C (PRIOR ART)
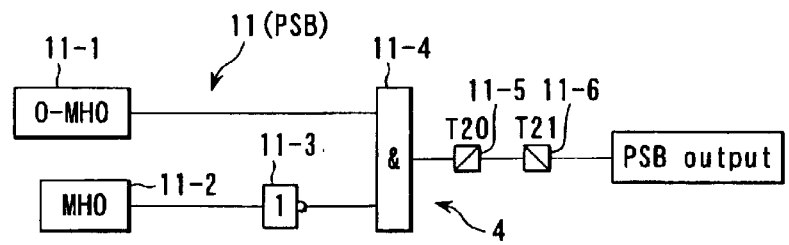
FIG. 19 (PRIOR ART)

PROTECTIVE RELAY SYSTEM

BACKGROUND OF THE INVENTION

1. Field of the Invention

The present invention relates to a protective relay system that is capable of protecting a power system by reliably eliminating a fault point when a fault occurs while the power system is oscillating.

2. Description of the Related Art

A prior art protective relay system will now be described with reference to FIG. 17.

FIG. 17 is a diagram showing a relationship between an existence region (a load region) of distance-measuring impedance Z caused by a power flow under sound load conditions of a power system and a fault direction detecting element (mho characteristics and ohm characteristics). Under the sound load conditions, the existence region of distance-measuring impedance Z is located away from the operating range of the fault direction detecting element. Thus, neither a mho relay nor a blinder relay operates to detect a fault unnecessarily.

If, however, the power system increases in power flow, the distance-measuring impedance approaches the operating range of the fault direction detecting element. It is thus likely that when the power system oscillates, the distance-measuring impedance will fall within the operating range of the fault direction detecting element and the relays will operate unnecessarily to trip a circuit breaker though no faults occur.

While the power system is oscillating, the relay system usually detects the oscillation and locks an operation signal output from a distance relay including the fault direction detecting element.

A method for detecting a system oscillation is described in Electric Technology Research, Vol. 37, No. 1, p. 65. According to this Research, the oscillation is detected by considering a change in the locus of impedance to be a difference in operation time between a mho relay and an offset mho relay as direction detecting elements having different operating zones or a difference in operation time between two blinder relays.

FIG. 18 shows impedance characteristics appearing when a system oscillation is detected by a difference in operation time between a mho relay 11-2 and an offset mho relay 11-1. When the locus of impedance Z is moved by the system oscillation as indicated by arrow 2, the offset mho relay 11-1 operates at time t1 and the mho relay 11-2 operates at time t2. If a time difference (t2−t1) is not smaller than a set value, a system oscillation detection relay (PSB) 11 determines that a system oscillation (including a loss of synchronization) occurs and locks the operation of the distance relay. The lock is released after a fixed period of time elapses after the locus of impedance Z falls outside the operating range of the offset mho relay 11-1 in order to prevent a mistrip. FIG. 19 illustrates an example of the system oscillation detection relay (PSB) 11.

Referring to FIG. 19, the relay 11 includes an offset mho relay 11-1, a mho relay 11-2, a NOT circuit 11-3, and an AND circuit 11-4. The AND circuit 11-4 has an operating condition that is met when the offset mho relay 11-1 operates and the mho relay 11-2 does not operate. The relay also includes an on-delay timer (TDE) 11-5 that outputs a signal "1" when the signal "1" of the AND circuit 11-4 continues to be output for not shorter than time T20.

In other words, when time (t2−t1) required from when the impedance Z falls within the operating range of the offset mho relay 11-1 until it falls within the operating range of the mho relay 11-2 is longer than setting time T20 of the on-delay timer (TDE) 11-5, the system oscillation detection relay (PSB) 11 determines that the power system is oscillating and the on-delay timer 11-5 outputs a system oscillation detection signal "1."

When the on-delay timer 11-5 detects the system oscillation, an off-delay timer 11-6 continues to output the system oscillation detection signal "1" for a time period of T21.

In FIG. 19, a PSB output means a system oscillation detection signal.

The system oscillation detecting relay 11 is basically configured such that the relay 11 locks an operation signal output from the distance relay whenever it detects a system oscillation and then continues the lock (holds the preceding value) even when a fault occurs in a protective area for a power transmission line. This means that the prior art protective relay system does not operate erroneously when a fault occurs in a protective area during the system oscillation.

The system oscillation is a phenomenon appearing in three-phase equilibrium. When a fault occurs during the system oscillation, the lock of an operation signal output from the protective relay system is released in accordance with the level of a zero-phase-sequence current, a negative-phase-sequence current, or the like. However, this method does not take into consideration the selectivity of a fault direction (Electric Technology Research, Vol. 37, No. 1, p. 66).

It is thus likely that the protective relay system will operate unnecessarily due to zero-phase-sequence and negative-phase-sequence currents caused by a fault occurring outside a protective area and by unbalanced components in an open-phase state of a single-phase reclosing relay.

A direction determination element of a direction comparison distance relay, which uses a double polarity voltage using an amount of electricity of a fault phase and that of electricity that is unsusceptible to variations in phase before and after a fault as a reference value, is in practical use (disclosed in Jpn. Pat. KOKOKU Pub. No. 64-6608).

On the other hand, a user has recently desired to quickly eliminate a fault that has occurred in a protected area during the oscillation of a system. However, there is a problem that a fault is difficult to determine by a direction determination element using the above polarity amount during the oscillation. The reason is as follows. The oscillation varies a system voltage, an amount of current, and a phase, and an amount of polarity necessary for determining a fault direction is not fixed, with the result that the fault direction cannot be determined correctly.

As the most remarkable examples of system oscillation, FIGS. 20A to 20C show vectors of voltage and current during a loss of synchronization. The diagrams of vectors are shown using a voltage of phase A as a reference voltage. It is seen from FIGS. 20A to 20C that the vectors of current vary from moment to moment. In FIG. 20A, a relationship between voltage and current is almost close to the state of a receiving power flow. In FIG. 20B, the relationship is close to the state in which a fault occurs. In FIG. 20C, the relationship is close to the state of a sending power flow. Such an amount of electricity accompanied with variations in phase is not suitable for an amount of polarity.

BRIEF SUMMARY OF THE INVENTION

An object of the present invention is to provide a protective relay system that is capable of reliably eliminating a fault point and protecting a power system.

A protective relay system according to an aspect of the present invention comprises a negative-phase-sequence relay that can correctly determine a direction of a fault during system oscillation. A circuit breaker is tripped only when an internal fault is determined at both terminals to be protected using a carrier signal. Thus, even though a fault occurs during system oscillation, the circuit breaker can be tripped against the internal fault.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 18 is a diagram showing an existence region of a short-circuit impedance in a one-line ground to explain the prior art protective relay system.

FIG. 19 is a block diagram showing an example of an oscillation detection relay.

FIGS. 20A to 20C are diagrams each showing a relationship in vector phase between voltage and current at the time of system oscillation.

DETAILED DESCRIPTION OF THE INVENTION

Embodiments of the present invention will now be described with reference to the accompanying drawings.

(First Embodiment)

A protective relay system according to a first embodiment of the present invention will now be described with reference to FIGS. 1 and 2.

Figure 1:
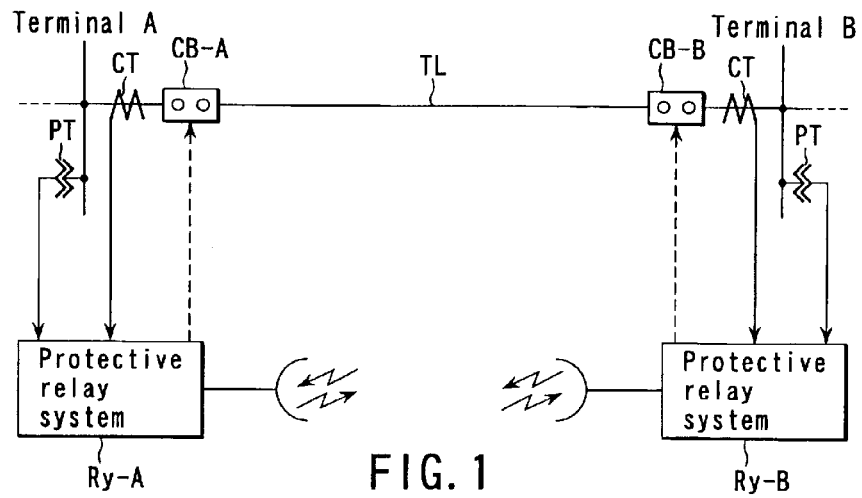
FIG. 1 is a conceptual diagram of a protective relay system.

In FIG. 1, TL indicates a power transmission line for interconnecting terminals A and B of a power system, which is to be protected. Protective relay systems Ry-A and Ry-B for protecting the transmission line upon receipt of current I and voltage V from a current transformer CT and a voltage transformer PT are provided at the terminals A and B, respectively.

The protective relay systems Ry-A and Ry-B have the same configuration. The internal configuration of the protective relay system Ry-A will be described as a representative example.

Figure 2:
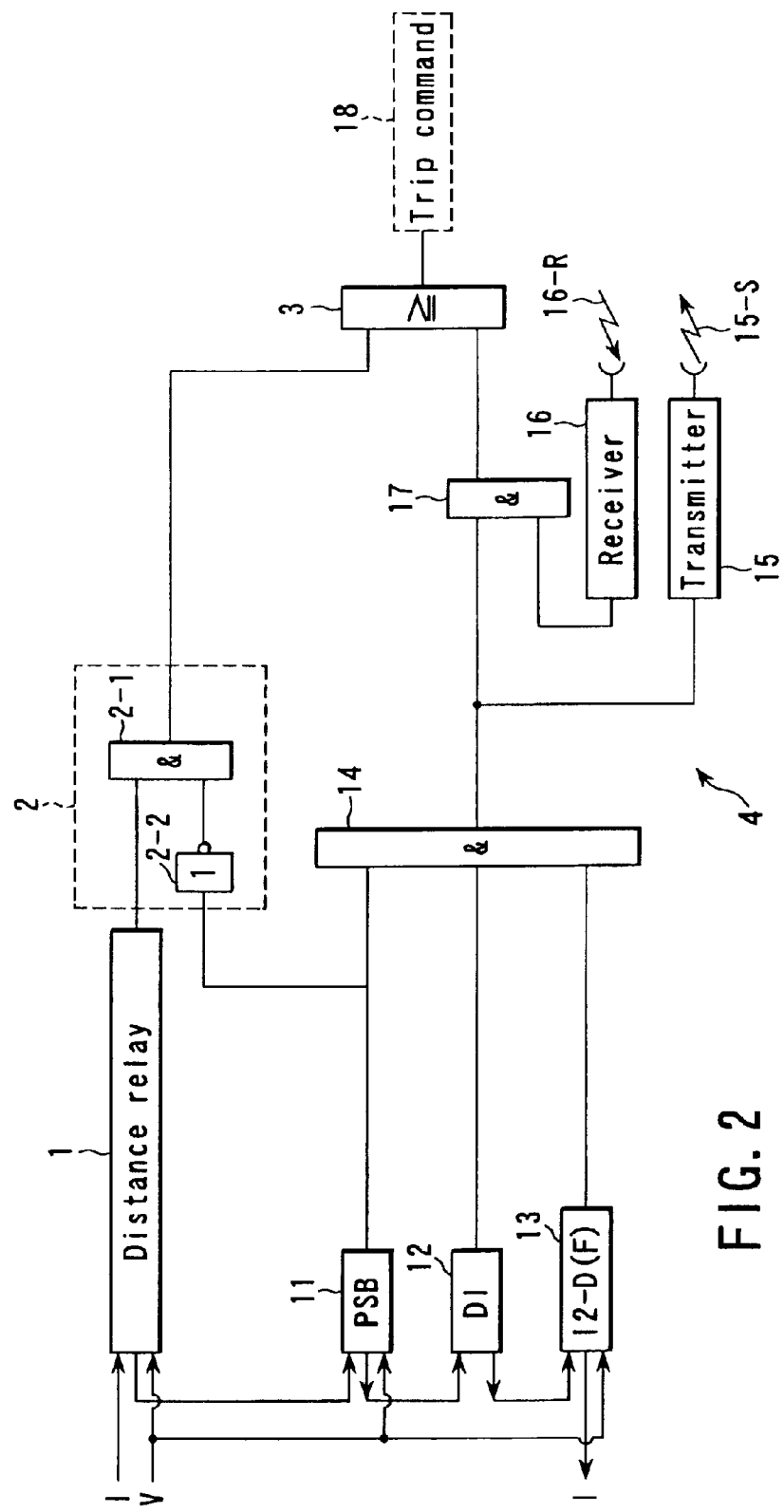
FIG. 2 is a block diagram of a protective relay system according to a first embodiment of the present invention.

FIG. 2 is a block diagram showing the protective relay system Ry-A of FIG. 1 in detail.

In FIG. 2, reference numeral 1 denotes a distance relay serving as a main protective relay system. The distance relay 1 performs a distance-measuring operation based on the voltage and current received from the terminal A and operates when the obtained distance-measuring impedance is not higher than a set value and it is applied into the power transmission line TL.

Reference numeral 2 indicates a trip locking circuit that locks a trip of a circuit breaker caused by the distance relay 1. The circuit 2 includes a NOT circuit 2-2 that inverts an operation signal of an oscillation detection relay 11 (described later) and outputs the inverted signal and an AND circuit 2-1 that receives an output signal of the NOT circuit 2-2 and an operation signal of the distance relay 1.

The oscillation detecting relay 11 corresponds to that shown in FIG. 19. The relay 11 is abbreviated as PSB (Power Swing Block) in FIG. 2 and outputs a signal "1" when it detects a system oscillation.

Reference numeral 12 indicates a current change detection relay DI. There are several methods of determining an operation of the current change detection relay 12. When an instantaneous value of the current obtained at a certain point is Im and that of the current obtained two cycles before is Im−2, an actual value of a difference between them is obtained as a current variation ΔIm (=Im−Im-2). The relay 12 operates when the current variation ΔIm is not less than a sensitivity set value.

The way to determine a sensitivity set value of the current change detection relay 12 will be described. In general, the current variation ΔIm caused during system faults is greater than that caused by a frequency drift of the system during system oscillation. It is thus desirable that the sensitivity set value be greater than the current variation ΔIm caused during system oscillation and not greater than the current variation ΔIm caused during system faults.

If the sensitivity set value is set as described above, the current change detection relay 12 does not operate unnecessarily during system oscillation but operate only during system faults.

The relay 12 can be used for selecting a fault phase since it usually operates only in the fault phase. The selection of the fault phase will be described with reference to the circuit shown in FIG. 3.

In FIG. 2, reference numeral 13 indicates a negative-phase-sequence (forward) directional element (simply referred to as a negative-phase-sequence relay 13). The relay 13 determines whether a fault occurs in a protecting (forward) direction using a negative-phase component. Since the relay 13 is one that detects a forward fault, it is abbreviated as I2-D(F) in FIG. 2. The negative-phase-sequence relay 13 is described in, e.g., Electric Technology Research, Vol. 37, No. 1, p. 54. Its detailed descriptions are omitted accordingly.

Reference numeral 14 denotes an AND circuit &. The AND circuit 14 receives signals from the relays 11, 12 and 13. The AND conditions of the AND circuit 14 are met only when the relay 13 determines (I2-D(F) operation) that a system fault has occurred (DI operation) during system oscillation (PSB operation) and ahead of its own terminal.

If the AND conditions of the AND circuit 14 are met, a transmitter 15 transmits a circuit breaker trip permissive signal 15-S to the other terminal B. A receiver 16 receives a circuit breaker trip permissive signal 16-R and outputs a signal "1." The transmitter 15 and receiver 16 make up a telecommunication means.

Reference numeral 17 shows an AND circuit &. The AND circuit 17 gives a trip command 18 to a circuit breaker CB-A under conditions that the receiver 16 and AND circuit 14 each output a signal "1" or the receiver 16 is receiving the circuit breaker trip permissive signal 16-R from the other terminal B and the negative-phase-sequence relay 13 determines that a system fault occurs ahead of its own terminal A.

Reference numeral 3 indicates an OR circuit for detecting an OR condition between an output signal of the trip blocking circuit 2 and that of the AND circuit 17. The OR circuit 3 outputs a signal "1" upon receipt of one of the signals. In other words, if the AND circuit 17 outputs a signal though an output of the distance relay 1 is locked, it can output a trip command 18. The protective relay system Ry-B having the other terminal B performs the same operation as that of the protective relay system Ry-A. In the first embodiment, a combination of logic circuits (AND circuit, OR circuit, NOT circuit, etc.) for receiving signals from the relays 1, 11, 12 and 13 is referred to as a sequence circuit 4 for convenience' sake.

Figure 3:
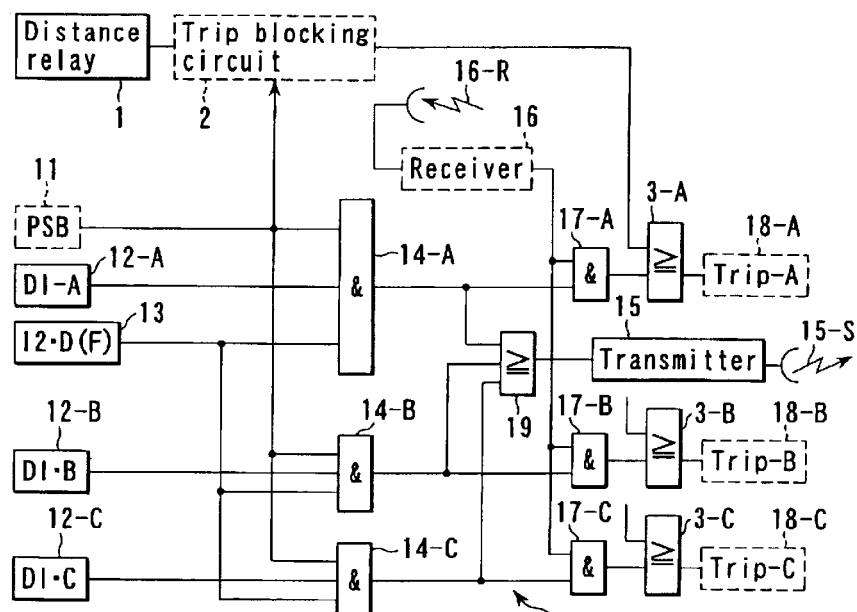
FIG. 3 is a block diagram showing three phases of the protective relay system of FIG. 2.

The foregoing descriptions have been made for the representative phase of the protective relay system. FIG. 3 shows three phases A, B and C of the protective relay system. The reference numerals shown in FIG. 3 are basically the same as those shown in FIG. 2. In order to distinguish the three phases from one another, subscripts -A, -B, and -C are written next to their corresponding reference numerals. Since the oscillation detection relay 11, the negative-phase-sequence relay 13, the transmission of circuit-breaker trip permissive signal 15-S, or the reception of circuit breaker trip permissive signal 16-R does not depend upon any phases, they are common to the three phases. The distance relay 1 and trip blocking circuit 2 are each shown for one phase in order to prevent the drawing from being complicated.

In FIG. 3, reference numeral 19 represents an OR circuit ≧ for detecting an OR condition among circuit-breaker trip permissive signals 15-S that are supplied to the other terminal B from AND circuits 14-A to 14-C of respective phases. If one of the AND circuits has only to output a circuit beaker trip permissive signal 15-S, the OR circuit 19 sends it to the other terminal B.

When the oscillation detecting relay 11 and negative-phase-sequence relay 13 operate while the receiver 16 is receiving a circuit breaker trip permissive signal 16-R from the other terminal B, the receiver 16 supplies circuit breaker trip commands 18-A, 18-B and 18-C, which correspond to their respective operation phases of current change detection relays 12-A, 12-B and 12-C, through AND circuits 17-A, 17-B and 17-C and OR circuits 3-A, 3-B and 3-C.

According to the first embodiment described above, when the distance relay 1 serving as a main protective relay operates while a power system is oscillating (the PSB is outputting a signal "1"), the trip blocking circuit 2 blocks a trip from the main protective relay. On the other hand, the AND circuits 17-A, 17-B and 17-C outputs a circuit breaker trip command 18 under conditions that the circuit-breaker trip permissive signals 15-S and 16-R are transmitted and received between both the terminals A and B. Thus, when a fault occurs during system oscillation, a fault point can reliably be eliminated in the protection direction though the distance relay 1 blocks a circuit breaker trip.

Figure 21:
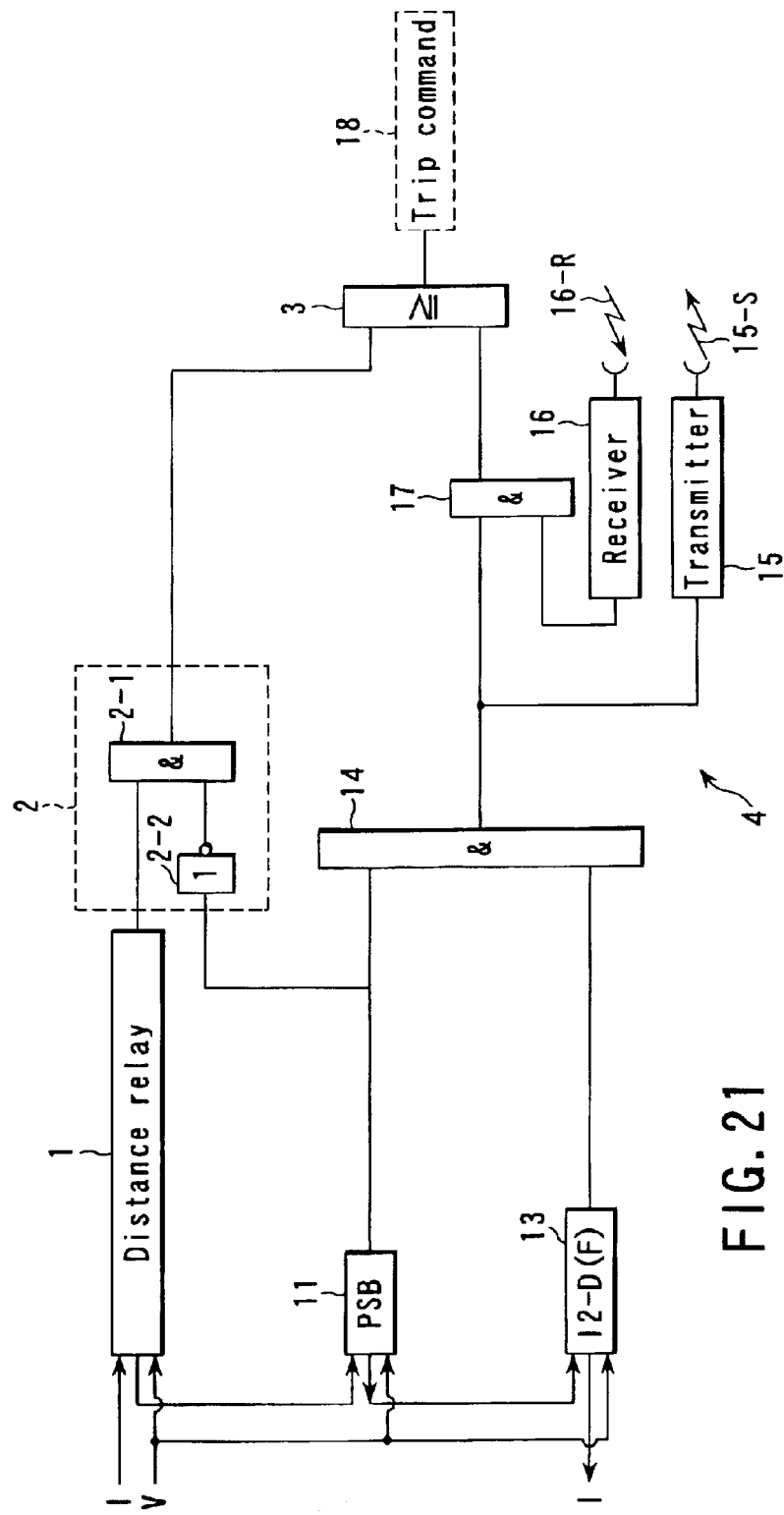
FIG. 21 is a block diagram of the protective relay system according to the first embodiment, which does not require any fault phase selection.

In the first embodiment, the current change detection relay 12 is not required if any fault phase need not be selected. In this case, the negative-phase-sequence relay 13 can determine a fault in the protection direction (forward direction), as shown in FIG. 21.

(Second Embodiment)

A protective relay system according to a second embodiment of the present invention will now be described with reference to FIG. 4. The same elements (relays and logic circuits) as those of the first embodiment are denoted by the same reference numerals and their descriptions are omitted.

Figure 4:
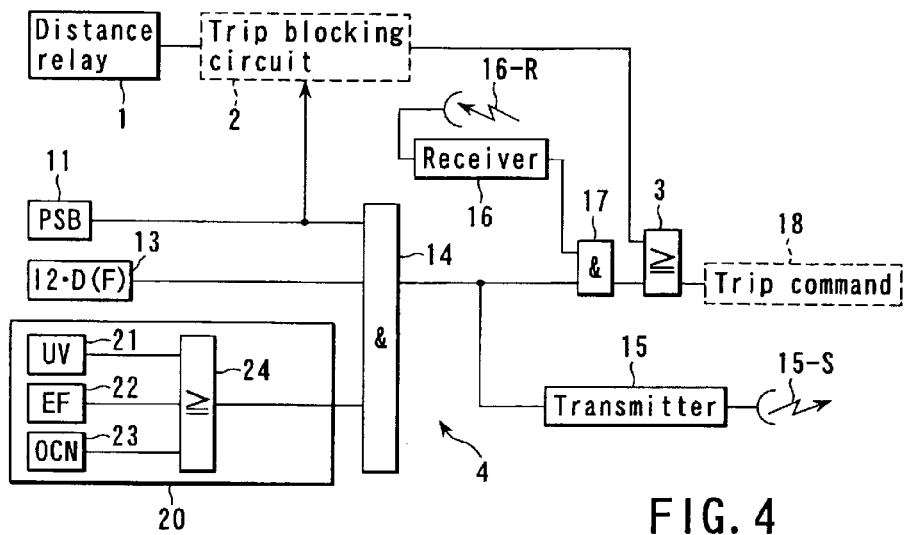
FIG. 4 is a block diagram of a protective relay system according to a second embodiment of the present invention.

The second embodiment shown in FIG. 4 differs from the first embodiment shown in FIG. 2 in that a fault detection circuit 20 indicated by the broken line is used in place of the current change detection relay 12 shown in FIG. 2. Since the other elements have been described above, only the circuit 20 will be described here.

In FIG. 4, reference numeral 21 indicates an undervoltage relay UV. The relay 21 operates when a system voltage becomes not higher than a set value due to a close-end fault. Only one undervoltage relay is shown in FIG. 4. Actually, it is desirable to arrange both a phase voltage UV for detecting a ground fault and a line-to-line voltage UV for detecting a short-circuit fault.

Reference numeral 22 represents a zero-phase-sequence overcurrent relay EF. The relay 22 operates if a zero-phase-sequence current whose amount is not smaller than a set value flows when a ground fault occurs. Needless to say, the relay 22 is common to the respective phases (all of the three phases).

Reference numeral 23 shows a negative-phase-sequence overcurrent relay OCN. The relay 23 operates if a negative-phase-sequence current (I2) whose amount is not smaller than a set value flows when an unbalanced fault occurs. The relay 23 is also common to the respective phases (all of the three phases).

Reference numeral 24 denotes an OR circuit. The circuit 24 outputs a signal "1" when one of the above relays 21, 22 and 23 operates. The output signal of the OR circuit 24 is one of input conditions of the AND circuit 14. During the detection of oscillation and the determination of a forward system fault, the AND circuit 14 outputs a circuit-breaker trip permissive signal 15-S when the output of the OR circuit 24 is "1." The other processing is identical with that shown in FIG. 2; therefore, its descriptions are omitted.

According to the second embodiment described above, even though a system fault, which cannot be detected by the current change detection relay 12, occurs, a circuit-breaker trip command 18 can be output by detecting the zero-phase-sequence current (IO), negative-phase-sequence current (12), and drop in voltage.

(Third Embodiment)

Figure 5:
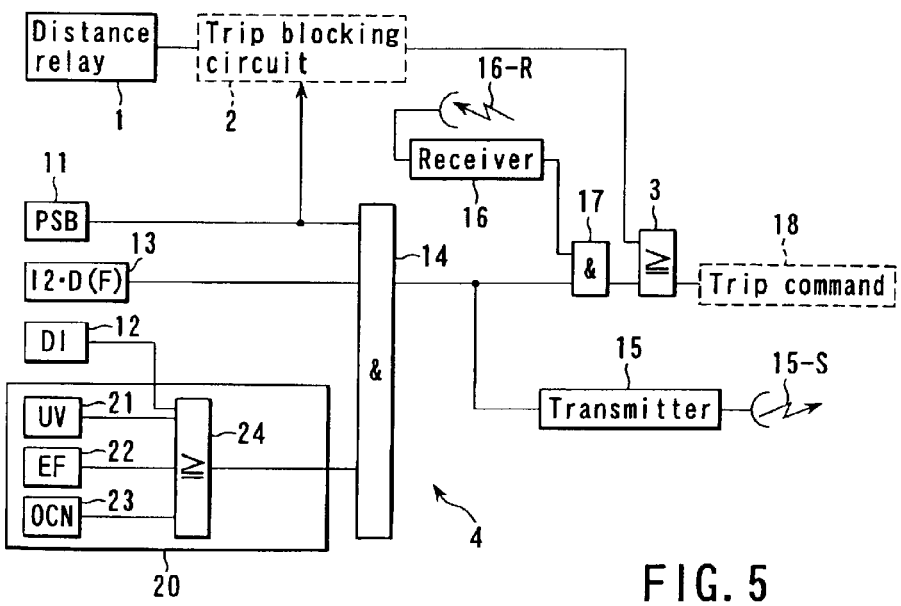
FIG. 5 is a block diagram of a protective relay system according to a third embodiment of the present invention.

A protective relay system according to a third embodiment of the present invention will now be described with reference to FIG. 5. The same elements (relays and logic circuits) as those of the first and second embodiments are denoted by the same reference numerals and their descriptions are omitted.

The protective relay system according to the third embodiment is configured by a combination of the relays shown in FIG. 2 and FIG. 4. The protective relay system detects a system fault if any one of four relays of zero-phase-sequence overcurrent relay 22, negative-phase-sequence overcurrent relay 23, current change detection relay 12, and undervoltage relay 21 operates. The system fault can thus be detected with higher precision.

(Fourth Embodiment)

Figure 6:
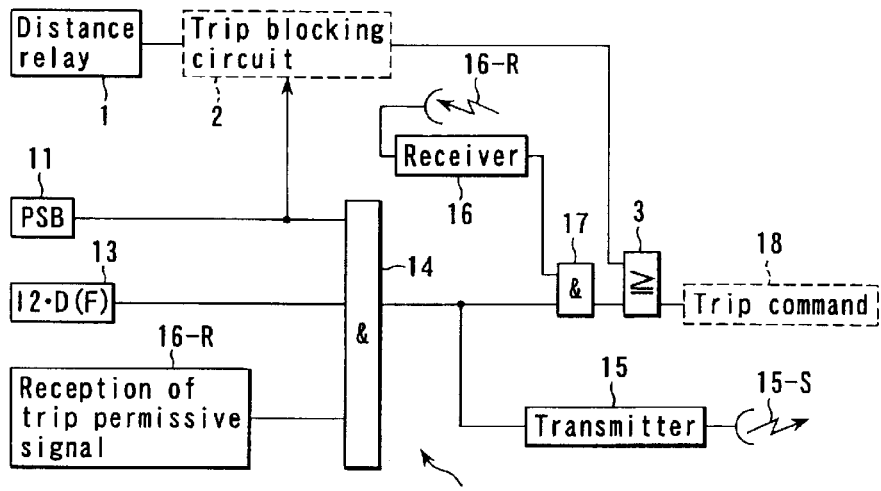
FIG. 6 is a block diagram of a protective relay system according to a fourth embodiment of the present invention.

A protective relay system according to a fourth embodiment of the present invention will now be described with reference to FIG. 6.

In the fourth embodiment, the current change detection relay 12 shown in FIG. 2 is replaced with a terminal for receiving a circuit breaker trip permissive signal 16-R. The system outputs a circuit breaker trip command 18 when it receives a circuit breaker trip permissive signal 16-R from the other terminal during the detection of a system oscillation and determines that a system fault is a forward one.

According to the fourth embodiment, when a fault cannot be detected at a terminal of a system because it occurs close to a terminal of the other system, a circuit breaker can be tripped if the fault has only to be detected at the terminal of the other system.

(Fifth Embodiment)

A protective relay system according to a fifth embodiment of the present invention will now be described with reference to FIG. 7. The same elements (relays and logic circuits) as those of the above embodiments are denoted by the same reference numerals and their descriptions are omitted. The fifth embodiment is featured by a combination of the functions of the systems shown in FIGS. 5 and 6.

In the fifth embodiment, the system detects a fault when any one of four relays of zero-phase-sequence overcurrent relay 22, negative-phase-sequence overcurrent relay 23, current change detection relay 12, and undervoltage relay 21, which are provided at its own terminal, operates or when it receives a circuit breaker trip permissive signal 16-R from a terminal of the other system.

(Sixth Embodiment)

Figure 7:
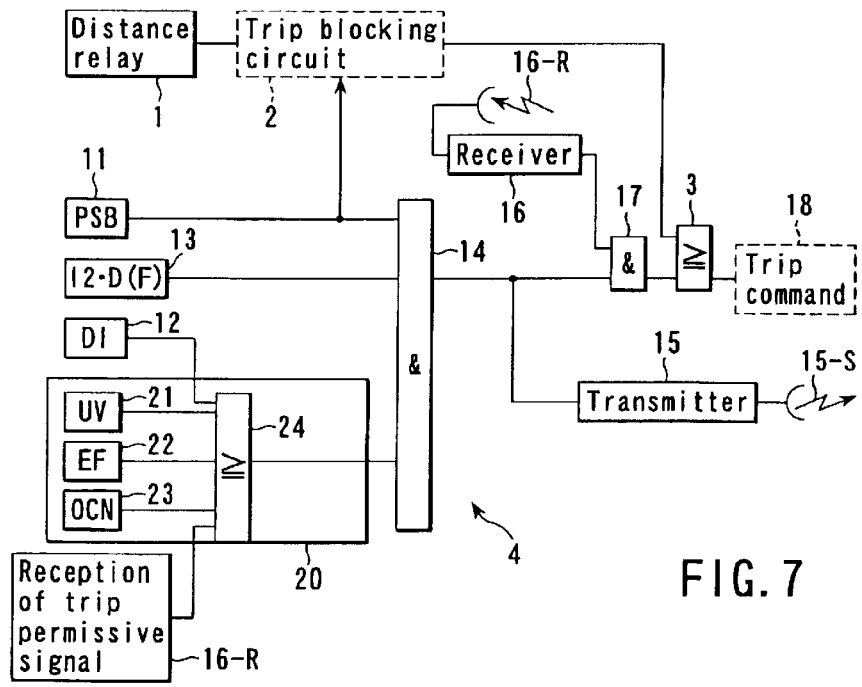
FIG. 7 is a block diagram of a protective relay system according to a fifth embodiment of the present invention.

In the above fifth embodiment shown in FIG. 7, when a fault is detected by the zero-phase-sequence overcurrent relay 22, the negative-phase-sequence 23 or the receipt of the circuit breaker trip permissive signal 16-R, the phase of the fault cannot be determined.

The undervoltage relay 21 can select a fault phase. However, there is a case where a sound-phase voltage drops during system oscillation, so that the phase selection capability of the undervoltage relay 21 is lower than that of the current change detection relay 12. The fault phase selection capability of the current change detection relay 12 is high; however, there is a case where the relay 12 cannot perform any detecting operation because a difference in current variation due to a fault is lessened at timing when the amount of current increases by the system oscillation.

Figure 8:
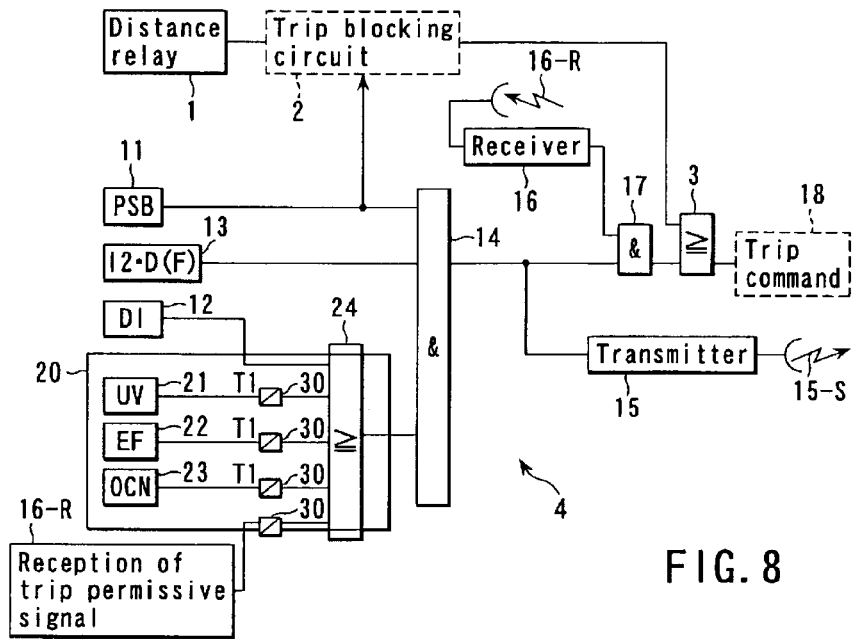
FIG. 8 is a block diagram of a protective relay system according to a sixth embodiment of the present invention.

Taking into consideration the above, a protective relay system according to a sixth embodiment of the present invention will be described with reference to FIG. 8. In the sixth embodiment, the current change detection relay 12 serves as a main fault detection one and the other relays (undervoltage relay 21, zero-phase-sequence overcurrent relay 22, and negative-phase-sequence overcurrent relay 23) serve as backup ones.

Since the relays 21, 22 and 23 are used as backup ones, an on-delay timer 30 serving as a confirmation timer is added to each of the relays 21, 22 and 23 and a circuit that has processed a received trip permissive signal 16-R.

The on-delay timer 30 allows a fault-phase circuit breaker to be tripped the near instant that the current change detection relay 12 operates. If the relay 12 does not operate, the circuit breaker can be tripped by the backup relays 21, 22 and 23 in a short time. The set value of the on-delay timer 30 is favorably about 100 ms to 1 s because it is longer than a normal period of circuit breaker trip time as a guide.

(Seventh Embodiment)

A protective relay system according to a seventh embodiment of the present invention will now be described with reference to FIG. 9.

The seventh embodiment is featured in that a zero-phase-sequence relay 40 is used in replace of the negative-phase-sequence relay 13 of the first embodiment shown in FIG. 2. In FIG. 9, the zero-phase-sequence relay 40 is abbreviated as I0-D(F) as one for detecting a forward fault.

Since the zero-phase-sequence relay 40 is described in, for example, Electric Technology Research, Vol. 37, No. 1, p. 54, its detailed descriptions are omitted.

When a ground fault occurs, the zero-phase-sequence relay 40 basically determines the direction of the fault by current I0 flowing and voltage V0 generating only at the time of the fault. The relay 40 can correctly determine the direction even during system oscillation.

According to the seventh embodiment, the direction of a fault occurring during system oscillation can correctly be determined and the circuit breaker can be tripped against an internal fault.

Figure 22:
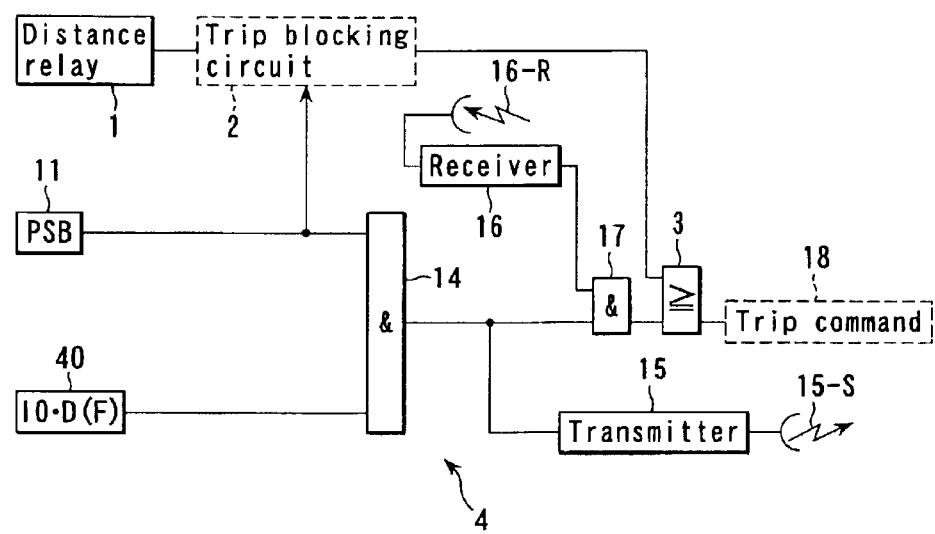
FIG. 22 is a block diagram of the protective relay system according to the seventh embodiment, which does not require any fault phase selection.

In the seventh embodiment, the current change detection relay 12 is not required if any fault phase need not be selected. In this case, the zero-phase-sequence relay 40 can determine a fault in the protection direction (forward direction), as shown in FIG. 22.

(Eighth Embodiment)

Figure 9:
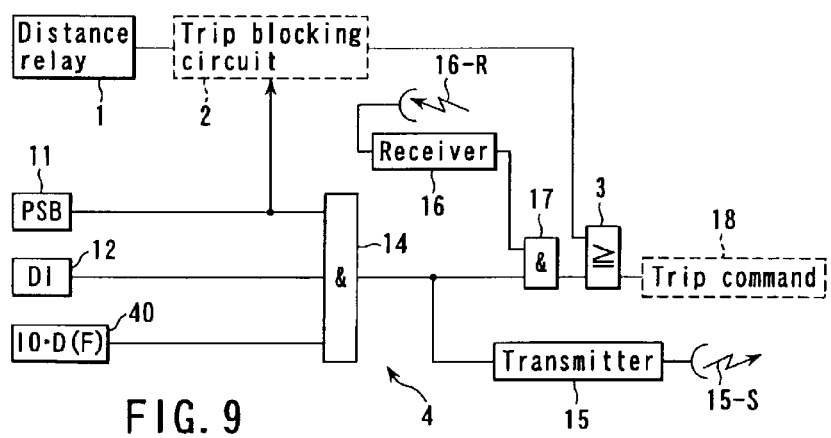
FIG. 9 is a block diagram of a protective relay system according to a seventh embodiment of the present invention.
Figure 10:
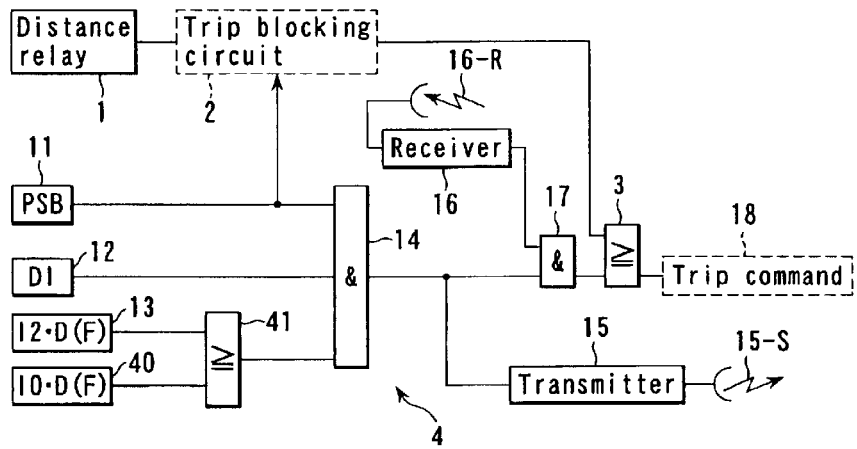
FIG. 10 is a block diagram of a protective relay system according to an eighth embodiment of the present invention.

In the seventh embodiment shown in FIG. 9, the direction of a short-circuit fault that is not accompanied with a ground fault cannot be determined. To take measures against this, the negative-phase-sequence relay 13 and zero-phase-sequence relay 40 are used under OR conditions in the eighth embodiment as shown in FIG. 10. The eighth embodiment can thus be applied to unbalanced faults of both ground and short-circuit faults.

In FIG. 10, reference numeral 41 indicates an OR circuit to detect an OR condition between an output signal of the zero-phase-sequence relay 40 and that of the negativephase-sequence relay 13. According to the eighth embodiment, therefore, the circuit breaker can be tripped if one of the relays 40 and 13 operates.

Since the concepts of the seventh and eighth embodiments shown in FIGS. 9 and 10 are the same as those of the embodiments shown in FIGS. 3 to 8, their descriptions are omitted.

(Ninth Embodiment)

A protective relay system according to a ninth embodiment of the present invention will now be described with reference to FIG. 11.

In the ninth embodiment, a positive-phase-sequence relay 50 using an amount of double polarity electricity is used in place of the negative-phase-sequence relay 13 shown in FIG. 2 and an unbalanced fault detection circuit 60 is newly added. The AND circuit 14 detects AND conditions among the positive-phase-sequence relay 50, unbalanced fault detection circuit 60, oscillation detection relay (PSB) 11, and current change detection relay 12.

The positive-phase-sequence relay 50 serves as a directional distance element for earth fault (GI) and a directional distance element for phase fault (SI) by a mho relay.

The unbalanced fault detection circuit 60 includes a negative-phase-sequence overcurrent relay (OCN) 61, a negative-phase-sequence overvoltage relay (OVN) 62, an OR circuit 63, and a NOT circuit 64. The OCN 61 detects that a negative-phase-sequence current (I2) flows not smaller than a set value. The OVN 62 detects that a negative-phase-sequence voltage (V2) is generated not lower than a set value. The OR circuit 63 detects an OR condition of output signals of the relays 61 and 62. The NOT circuit 64 inverts an output signal of the OR circuit 63.

A negative-phase-sequence component is generated if an unbalanced fault occurs in the system. In the ninth embodiment shown in FIG. 11, the OCN 61 or OVN 62 detects the negative-phase-sequence component and the OR circuit 63 outputs a signal "1." The NOT circuit 64 inverts an output signal of the OR circuit 63 to a signal "0" and supplies it to the AND circuit 14.

Consequently, the unbalanced fault detection circuit 60 outputs a signal "0" when an unbalanced component is generated in the system and outputs a signal "1" when no unbalanced component is generated therein.

In other words, the current change detection relay 12 can detect a fault occurring during system oscillation. However, the fault is a balanced one and thus no negative-phase-sequence component is generated, with the result that neither the negative-phase-sequence relay 13 nor zero-phase-sequence relay 40 can detect the direction of the fault. In the ninth embodiment, the circuit breaker is tripped by another direction detection element (positive-phase-sequence relay 50). The other relays and logic circuits have been described above and their descriptions are omitted here.

According to the ninth embodiment, the circuit breaker can be tripped against a balanced fault whose direction cannot be detected by the relay 13 or 40.

(Tenth Embodiment)

A protective relay system according to a tenth embodiment of the present invention will now be described with reference to FIG. 12.

Figure 11:
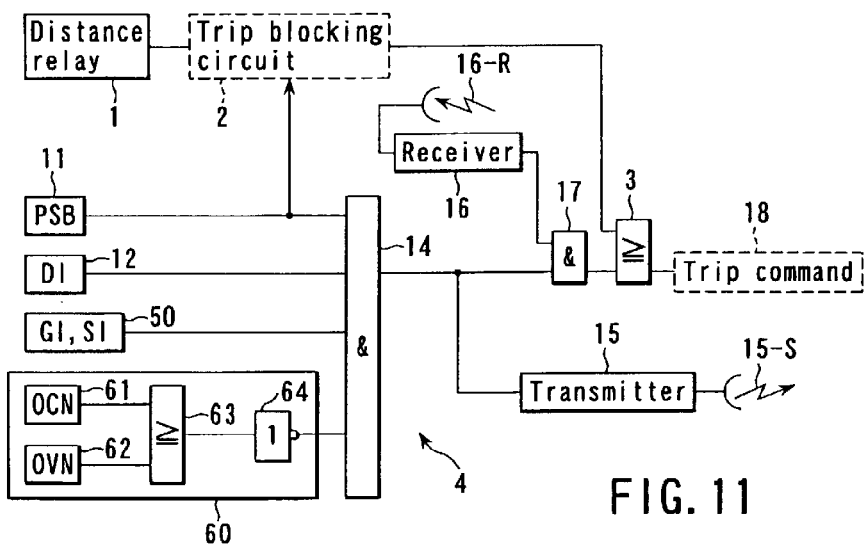
FIG. 11 is a block diagram of a protective relay system according to a ninth embodiment of the present invention.

In the tenth embodiment, a close-end fault direction detection circuit 70 is provided in place of the directional-ground relay GI and directional-short-circuit relay SI of the positive-phase-sequence relay 50 shown in FIG. 11. The circuit 70 can detect a close-end three-phase fault occurring ahead thereof. The circuit 70 includes a phase overcurrent relay (OC) 71 that outputs a signal "1" when a current flows more than a set value, an undervoltage relay (UV 3-phase) 72 that detects a drop in voltage of three phases, and an AND circuit 73. When a system fault occurs to drop the voltages of all the three phases and cause a current to flow more than a fixed value, the close-end fault direction detection circuit 70 operates to output a signal "1."

According to the tenth embodiment, even in the case where the direction of a three-phase fault that has occurred very close to a relay cannot be determined because there is hardly any voltage, the overcurrent relay 71 can correctly determine that the three-phase fault is an internal one, and a circuit breaker can be tripped accordingly.

Figure 12:
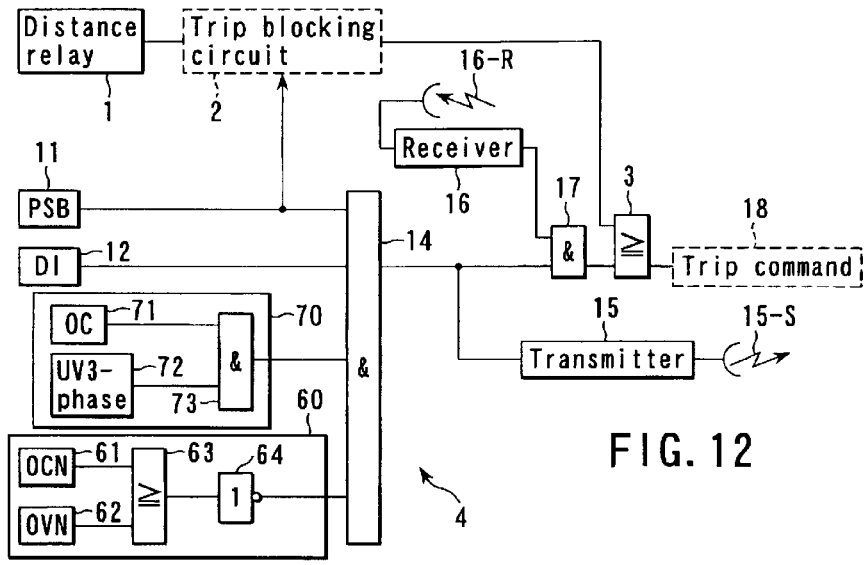
FIG. 12 is a block diagram of a protective relay system according to a tenth embodiment of the present invention.
Figure 13:
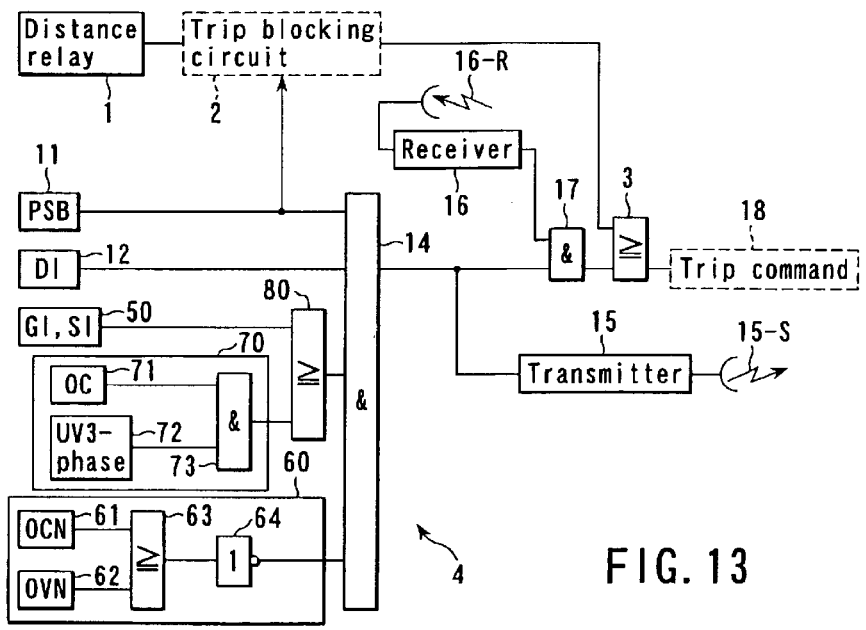
FIG. 13 is a block diagram of a protective relay system according to an eleventh embodiment of the present invention.

It is more effective to combine the close-end fault direction detection circuit 70 shown in FIG. 12 and the positive-phase-sequence relay 50 including the relays GI and SI and the unbalanced fault detecting circuit 60 shown in FIG. 11. This combination is shown in FIG. 13 as an eleventh embodiment of the present invention.

(Eleventh Embodiment)

The eleventh embodiment is directed to a protective relay system wherein the operation signals output from the directional-ground relay GI and directional-short-circuit relay SI of the positive-phase-sequence relay 50 and the operation signal output from the close-end fault direction detection circuit 70 are supplied to an OR circuit 80, and the signal output from the OR circuit 80 is supplied to the AND circuit 14.

According to the eleventh embodiment, if a voltage remains when a balanced fault occurs in a protective area, a circuit breaker can be tripped by the relays GI and SI. If a voltage is lost when a close-end fault occurs, a circuit breaker can be tripped by the close-end fault direction detection circuit 70. Consequently, the circuit breaker can be tripped in both cases of the presence of voltage in a balanced fault and the absence of voltage in a close-end fault.

(Twelfth Embodiment)

A protective relay system according to a twelfth embodiment of the present invention will now be described with reference to FIG. 14.

Figure 14:
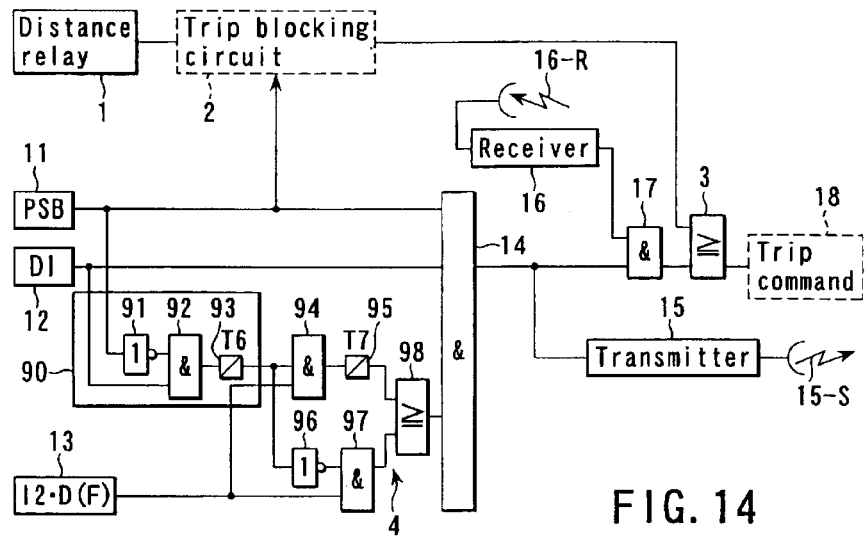
FIG. 14 is a block diagram of a protective relay system according to a twelfth embodiment of the present invention.

The protective relay system shown in FIG. 14 includes a detection circuit 90 for detecting a circuit breaker trip delay condition and delay circuits 94 to 98 in addition to the elements of the protective relay system of the first embodiment shown in FIG. 2. The delay circuits 94 to 98 delay a trip of the circuit breaker upon receipt of the output of the detection circuit 90.

First, the detection circuit 90 will be described. The circuit 90 includes a NOT circuit 91 that inverts an output signal of the oscillation detection relay 11 and outputs the inverted signal. The NOT circuit 91 outputs a signal "0" when the relay 11 operates and outputs a signal "1" when it does not operate (when the relay 11 does not detect any oscillation). The circuit 90 also includes an AND circuit 92 that outputs a signal "1" when the oscillation detection relay 11 does not operate (the output of the NOT circuit 91 is "1") and the current change detection relay 12 operates (output "1"). The circuit 90 also includes an off-delay timer 93 that causes the AND circuit 92 to continuously output the signal "1" for a given period of time.

The trip delay circuits 94 to 98 include an AND circuit 94, an on-delay timer 95 that outputs a signal "1" when the AND circuit 94 continues to output a signal for longer than a give period of time, a NOT circuit 96, an AND circuit 97, and an OR circuit 98.

If the oscillation detection relay 11 does not operate when the current change detection relay 12 operates, the conditions of the AND circuit 92 are met, and the detection circuit 90 supplies a signal "1" to the AND circuit 94 through the off-delay timer 93 for a set period of time. The AND circuit 94 detects an AND condition between the signal "1" output from the detection circuit 90 and the signal output from the negative-phase-sequence relay 13.

When the detection circuit 90 outputs a signal "1," the NOT circuit 96 outputs a signal "0." Then, the AND circuit 97 does not detect any AND condition between the signal "0" and the output signal of the relay 13.

According to the twelfth embodiment, if the current change detection relay 12 operates and the oscillation detection relay 11 does not operate when the negative-phase-sequence relay 13 detects a forward fault, the input condition of the AND circuit 94 is met. However, the output signal "1" of the AND circuit 94 is delayed by a fixed period of time by the on-delay timer 95 and the delayed signal is supplied to an OR circuit 98 on the subsequent stage.

On the other hand, if the detection circuit 90 does not output a signal "1" when the negative-phase-sequence relay 13 detects a forward fault (the output of the off-delay timer 93 is "0"), the NOT circuit 96 outputs a signal "1." Then, the input condition of the AND circuit 97 is met, and the signal "1" is supplied to the AND circuit 14 via the OR circuit 98.

Consequently, if no system oscillation is detected when a forward fault is detected, the operating condition of the detection circuit 90 is met, and the signal "1" is delayed by a setting time period by the on-delay timer 95 and the delayed signal is supplied to the OR circuit 98.

According to the twelfth embodiment described above, if a system oscillation is erroneously detected due to a backward fault or the like and a fault current is reversed by eliminating the backward fault, the OR circuit 98 does not output a signal "1" even though the negative-phase-sequence relay 13 operates for a short time. It is thus possible to prevent a mistrip of the circuit breaker.

In the twelfth embodiment, the detection circuit 90 may have a circuit arrangement different from that shown in FIG. 14.

(Thirteenth Embodiment)

A protective relay system according to a thirteenth embodiment of the present invention will now be described with reference to FIG. 15.

Figure 15:
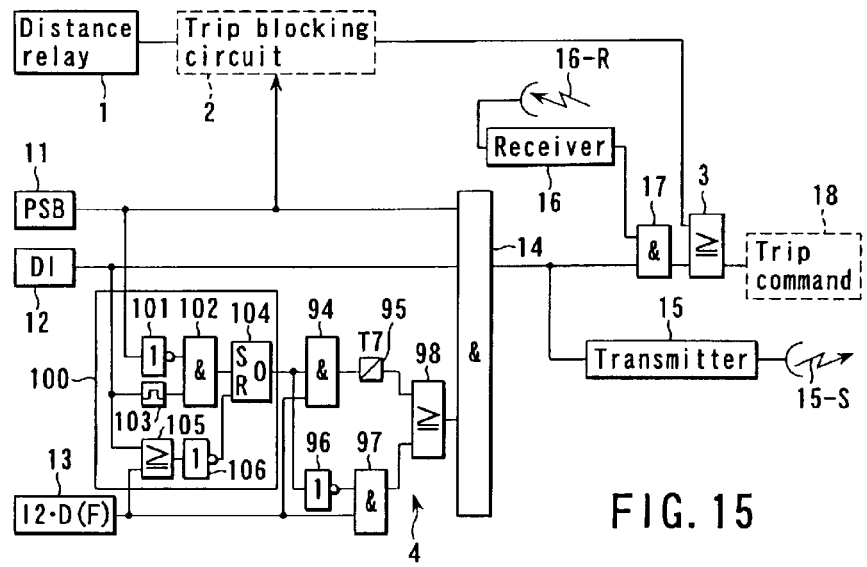
FIG. 15 is a block diagram of a protective relay system according to a thirteenth embodiment of the present invention.

The protective relay system shown in FIG. 15 includes a circuit breaker trip delay condition detection circuit 100 corresponding to the detection circuit 90 shown in FIG. 14.

The detection circuit 100 will be described. The detection circuit 100 includes a NOT circuit 101, an AND circuit 102, a one-shot timer 103, a flip-flop circuit 104, an OR circuit 105, and a NOT circuit 106.

The detection condition of the AND circuit 102 is that the current change detection relay 12 detects a variation in current (output "1") and the oscillation detection relay 11 does not detect any oscillation (output "0"). The reason why the one-shot timer 103 is added to the circuit 100 is to restrict the detection timing of the relay 12 since the operation time of the relay 12 is not constant. The one-shot timer 103 can be added to the circuit 90 shown in FIG. 14.

The set condition (S) of the flip-flop circuit 104 is met when the AND condition of the AND circuit 102 is done. The reset condition (R) thereof is met when the output of the current change detection relay 12 or negative-phase-sequence relay 13 is returned to "0" and the output of the NOT circuit 106 becomes "1." If the oscillation detection relay 11 has not detected any oscillation, the output signal of the AND circuit 94 is always input to the on-delay timer 95 until the operating of the current change detection relay 12 ends.

The detection circuit 100 is slightly more complicated than the detection circuit 90. However, it does not require any off-delay timer 13 and thus can stably be operated.

(Fourteenth Embodiment)

A protective relay system according to a fourteenth embodiment of the present invention will now be described with reference to FIG. 16.

The fourteenth embodiment can be applied to both the fault direction detections performed by the negative-phase-sequence relay 13 and zero-phase-sequence relay 40 during system oscillation (see FIG. 9). The application of the fourteenth embodiment to the protective relay system shown in FIG. 2 will be described hereinafter.

Figure 16:
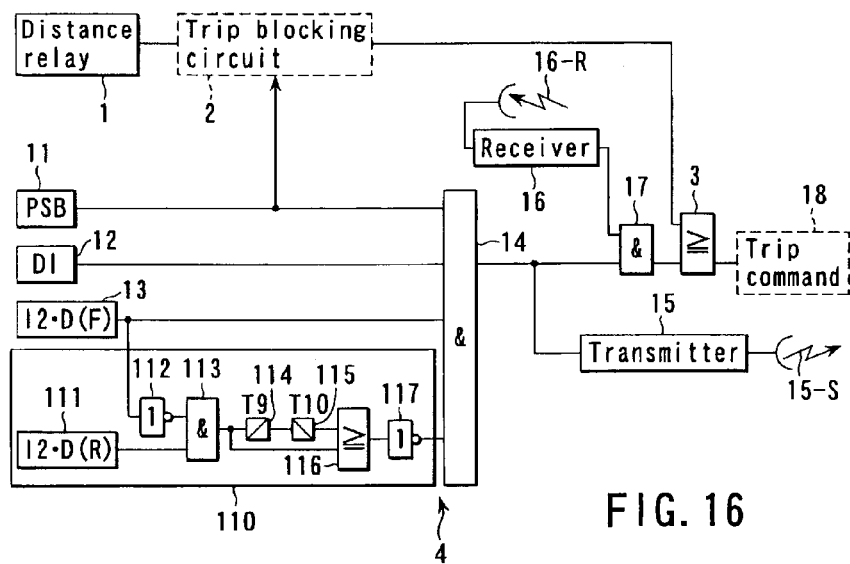
FIG. 16 is a block diagram of a protective relay system according to a fourteenth embodiment of the present invention.
Figure 17:
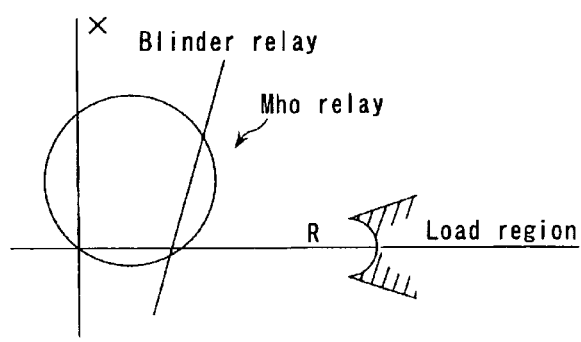
FIG. 17 is a diagram showing an impedance region of a load to explain a prior art protective relay system.

The protective relay system shown in FIG. 16 includes a circuit 110 as an input condition of the AND circuit 14 shown in FIG. 2. Hereinafter the circuit 110 will be described. The circuit 110 includes a backward fault determination element I2-D(R) 111 of a negative-phase-sequence relay. The circuit 110 also includes a NOT circuit 112 and an AND circuit 113. The conditions of the AND circuit 113 are met when the negative-phase-sequence relays 13 and 111 detects a backward fault (R) and does not detect a forward fault (F).

The circuit 110 also includes an on-delay timer 114 for confirming that the conditions of the AND circuit 113 are met and an off-delay timer 115 for extending a confirmation output of the on-delay timer 114. If, therefore, the AND conditions (113) of the backward operation ("1" of 111) and forward non-operation ("0" of 13) of the negative-phase-sequence relays 13 and 111 continue for a period of setting time T9 of the on-delay timer 114, its state is extended to setting time T10 of the off-delay timer 115.

The circuit 110 includes an OR circuit 116 that receives an extension signal from the off-delay timer 115 and a condition meet signal from the AND circuit 113. The OR circuit 116 outputs a signal "1" while the negative-phase-sequence relay 111 is operating or the off-delay timer 115 is extending an output of the on-delay timer 114. The circuit 110 includes a NOT circuit 117.

The on-delay timer 114 is a timer for confirming a detection of a backward fault and has a period of setting time T2 ranging from 20 ms to 40 ms as a practically appropriate value. The off-delay timer 115 is a timer for locking a detection of a forward fault when the detection of the backward fault is confirmed. Thus, the setting time T10 of the off-delay timer 115 ranges from 50 ms to 100 ms in consideration of time variations of the operation of the circuit breaker.

According to the fourteenth embodiment, the circuit 110 outputs a signal "0" when a backward fault occurs during the detection of system oscillation and a fault current is reversed by eliminating the fault to operate the negative-phase-sequence relay 13 for a short time. A mistrip of the circuit breaker due to the backward fault can thus be prevented.

The circuit arrangement for preventing a circuit breaker mistrip due to the backward fault (I2-D(R)) as in the fourteenth embodiment can be used for detecting a direction of a fault by the negative-phase-sequence relay I2-D(F) and the zero-phase-sequence relay I0-D(F) during system oscillation (PSB). Both the protective relay systems of the thirteenth and fourteenth embodiments can be used simultaneously Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

This application is based upon and claims the benefit of priority from the Japanese priority Patent Application No. 2001-255527, filed Aug. 27, 2001, the entire contents of which are incorporated herein by reference.

What is claimed is:

1. A protective relay system comprising:

oscillation detection means for detecting an oscillation of a power system to perform a relay operation, based on an amount of electricity of the power system;

negative-phase-sequence forward fault determination means for performing a relay operation during system faults between opposed terminals to be protected, based on a relationship in phase between a negative-phase-sequence voltage and a negative-phase-sequence current that are extracted from a voltage and a current of the power system;

telecommunication means for transmitting/receiving a circuit breaker trip permissive signal between the opposed terminals to be protected; and circuit means for transmitting a circuit breaker trip permissive signal from one terminal of the opposed terminals to other terminal thereof through the telecommunication means when the oscillation detection means and the negative-phase-sequence forward fault determination means perform a relay operation and for giving a trip command to a circuit breaker at the one terminal when the one terminal receives a circuit breaker trip permissive signal from the other terminal.

2. A protective relay system comprising:

oscillation detection means for detecting an oscillation of a power system to perform a relay operation, based on an amount of electricity of the power system;

a current change detection relay which performs a relay operation when a variation in current of the power system is not less than a sensitivity set value;

negative-phase-sequence forward fault determination means for performing a relay operation during system faults between opposed terminals to be protected, based on a relationship in phase between a negative-phase-sequence voltage and a negative-phase-sequence current which are extracted from a voltage and a current of the power system;

telecommunication means for transmitting/receiving a circuit breaker trip permissive signal between the opposed terminals to be protected; and circuit means for transmitting a circuit breaker trip permissive signal from one terminal of the opposed terminals to other terminal thereof through the telecommunication means when the oscillation detection means, the current change detection relay, and the negative-phase-sequence forward fault determination means perform a relay operation and for giving a trip command to a circuit breaker at the one terminal when the one terminal receives a circuit breaker trip permissive signal from the other terminal.

3. A protective relay system comprising:

oscillation detection means for detecting an oscillation of a power system to perform a relay operation, based on an amount of electricity of the power system;

negative-phase-sequence forward fault determination means for performing a relay operation during system faults between opposed terminals to be protected, based on a relationship in phase between a negative-phase-sequence voltage and a negative-phase-sequence current which are extracted from a voltage and a current of the power system;

fault detection means for performing a relay operation when the amount of electricity of the power system forms a desired relationship with a sensitivity set value;

telecommunication means for transmitting/receiving a circuit breaker trip permissive signal between the opposed terminals to be protected; and circuit means for transmitting a circuit breaker trip permissive signal from one terminal of the opposed terminals to other terminal thereof through the telecommunication means when the oscillation detection means, the negative-phase-sequence forward fault determination means, and the fault detection means perform a relay operation and for giving a trip command to a circuit breaker at the one terminal when the one terminal receives a circuit breaker trip permissive signal from the other terminal.

4. The protective relay system according to claim 3, wherein the fault detection means is a zero-phase-sequence overcurrent relay which performs a relay operation when a zero-phase-sequence current of the power system is not smaller than the sensitivity set value.

5. The protective relay system according to claim 3, wherein the fault detection means is a negative-phase-sequence overcurrent relay which performs a relay operation when a negative-phase-sequence current of the power system is not smaller than the sensitivity set value.

6. A protective relay system comprising:

oscillation detection means for detecting an oscillation of a power system to perform a relay operation, based on an amount of electricity of the power system;

negative-phase-sequence forward fault determination means for performing a relay operation during system faults between opposed terminals to be protected, based on a relationship in phase between a negative-phase-sequence voltage and a negative-phase-sequence current which are extracted from a voltage and a current of the power system;

telecommunication means for transmitting/receiving a circuit breaker trip permissive signal between the opposed terminals to be protected; and circuit means for transmitting a circuit breaker trip permissive signal from one terminal of the opposed terminals to other terminal thereof and giving a trip command to a circuit breaker at the one terminal when the oscillation detection means and the negative-phase-sequence forward fault determination means perform a relay operation and the one terminal receives a circuit breaker trip permissive signal from the other terminal through the telecommunication means.

7. A protective relay system comprising:

oscillation detection means for detecting an oscillation of a power system to perform a relay operation, based on an amount of electricity of the power system;

negative-phase-sequence forward fault determination means for performing a relay operation during system faults between opposed terminals to be protected, based on a relationship in phase between a negative-phase-sequence voltage and a negative-phase-sequence current which are extracted from a voltage and a current of the power system;

a current change detection relay which performs a relay operation when a variation in current of the power system is not less than a sensitivity set value;

an undervoltage relay which performs a relay operation when the voltage of the power system is not higher than a sensitivity set value;

a first delay timer which delays an operation signal of the undervoltage relay by a setting time period and outputs a delayed signal;

a zero-phase-sequence overcurrent relay which performs a relay operation when a zero-phase-sequence current of the power system is not smaller than a sensitivity set value;

a second delay timer which delays an operation signal of the zero-phase-sequence overcurrent relay by a setting time period and outputs a delayed signal;

a negative-phase-sequence overcurrent relay which performs a relay operation when a negative-phase-sequence current of the power system is not smaller than a sensitivity set value;

a third delay timer which delays an operation signal of the negative-phase-sequence overcurrent relay by a setting time period and outputs a delayed signal;

telecommunication means for transmitting/receiving a circuit breaker trip permissive signal between the opposed terminals to be protected;

a fourth delay timer which delays a circuit breaker trip permissive signal, which is transmitted to one terminal of the opposed terminals from other terminal thereof through the telecommunication means, by a setting time period and outputs a delayed signal; and circuit means for transmitting a circuit breaker trip permissive signal from one terminal of the opposed terminals to other terminal thereof through the telecommunication means when the oscillation detection means and the negative-phase-sequence forward fault determination means perform a relay operation and the current change detection relay performs a relay operation or one of the first to fourth delay timers outputs a delayed signal and for giving a trip command to a circuit breaker at the one terminal when the one terminal receives a circuit breaker trip permissive signal from the other terminal.

8. A protective relay system comprising:

oscillation detection means for detecting an oscillation of a power system to perform a relay operation, based on an amount of electricity of the power system;

zero-phase-sequence forward fault determination means for determining a direction of a system fault between opposed terminals to be protected, based on an amount of zero-phase-sequence electricity supplied from the power system and performing a relay operation during the system fault;

telecommunication means for transmitting/receiving a circuit breaker trip permissive signal between the opposed terminals to be protected; and circuit means for transmitting a circuit breaker trip permissive signal from one terminal of the opposed terminals to other terminal thereof through the telecommunication means when the oscillation detection means and the zero-phase-sequence forward fault determination means perform the relay operation and for giving a trip command to a circuit breaker at the one terminal when the one terminal receives a circuit breaker trip permissive signal from the other terminal.

9. A protective relay system comprising:

oscillation detection means for detecting an oscillation of a power system to perform a relay operation, based on an amount of electricity of the power system;

zero-phase-sequence forward fault determination means for determining a direction of a system fault between opposed terminals to be protected, based on an amount of zero-phase-sequence electricity supplied from the power system and performing a relay operation during the system fault;

fault detection means for performing a relay operation when the amount of electricity of the power system forms a desired relationship with a sensitivity set value;

telecommunication means for transmitting/receiving a circuit breaker trip permissive signal between the opposed terminals to be protected; and circuit means for transmitting a circuit breaker trip permissive signal from one terminal of the opposed terminals to other terminal thereof through the telecommunication means when the oscillation detection means, the zero-phase-sequence forward fault determination means, and the fault detection means each perform the relay operation and for giving a trip command to a circuit breaker at the one terminal when the one terminal receives a circuit breaker trip permissive signal from the other terminal.

10. A protective relay system comprising:

oscillation detection means for detecting an oscillation of a power system to perform a relay operation, based on an amount of electricity of the power system;

zero-phase-sequence forward fault determination means for determining a direction of a system fault between opposed terminals to be protected, based on an amount of zero-phase-sequence electricity supplied from the power system and performing a relay operation during the system fault;

a current change detection relay which performs a relay operation when a variation in current of the power system is not less than a sensitivity set value;

an undervoltage relay which performs a relay operation when the voltage of the power system is not higher than a sensitivity set value;

a first delay timer which delays an operation signal of the undervoltage relay by a setting time period and outputs a delayed signal;

a zero-phase-sequence overcurrent relay which performs a relay operation when a zero-phase-sequence current of the power system is not smaller than a sensitivity set value;

a second delay timer which delays an operation signal of the zero-phase-sequence overcurrent relay by a setting time period and outputs a delayed signal;

a negative-phase-sequence overcurrent relay which performs a relay operation when a negative-phase-sequence current of the power system is not smaller than a sensitivity set value;

a third delay timer which delays an operation signal of the negative-phase-sequence overcurrent relay by a setting time period and outputs a delayed signal;

telecommunication means for transmitting/receiving a circuit breaker trip permissive signal between the opposed terminals to be protected;

a fourth delay timer which delays a circuit breaker trip permissive signal, which is transmitted to one terminal of the opposed terminals from other terminal thereof through the telecommunication means, by a setting time period and outputs a delayed signal; and circuit means for transmitting a circuit breaker trip permissive signal from one terminal of the opposed terminals to other terminal thereof through the telecommunication means when the oscillation detection means and the zero-phase-sequence forward fault determination means perform a relay operation and the current change detection relay performs a relay operation or one of the first to fourth delay timers outputs a delayed signal and for giving a trip command to a circuit breaker at the one terminal when the one terminal receives a circuit breaker trip permissive signal from the other terminal.

11. A protective relay system comprising:
oscillation detection means for detecting an oscillation of a power system to perform a relay operation, based on an amount of electricity of the power system;
a current change detection relay which performs a relay operation when a variation in current of the power system is not less than a sensitivity set value;
a positive-phase-sequence relay which performs a relay operation during system faults between opposed terminals to be protected using an amount of double polarity electricity of the power system;
unbalanced fault detection means for performing a relay operation when an amount of negative-phase-sequence electricity of voltage and current supplied from the power system is not smaller than a sensitivity set value;
telecommunication means for transmitting/receiving a circuit breaker trip permissive signal between the opposed terminals to be protected; and
circuit means for transmitting a circuit breaker trip permissive signal from one terminal of the opposed terminals to other terminal thereof through the telecommunication means when the unbalanced fault detection means does not perform a relay operation but the oscillation detection means, the current change detection relay, and the positive-phase-sequence relay perform a relay operation and for giving a trip command to a circuit breaker at the one terminal when the one terminal receives a circuit breaker trip permissive signal from the other terminal.

12. A protective relay system comprising:
oscillation detection means for detecting an oscillation of a power system to perform a relay operation, based on an amount of electricity of the power system;
a current change detection relay which performs a relay operation when a variation in current of the power system is not less than a sensitivity set value;
close-end balanced fault detection means for detecting a close-end balanced fault to perform a relay operation;
unbalanced fault detection means for performing a relay operation when an amount of negative-phase-sequence electricity of voltage and current supplied from the power system is not smaller than a sensitivity set value;
telecommunication means for transmitting/receiving a circuit breaker trip permissive signal between the opposed terminals to be protected; and
circuit means for transmitting a circuit breaker trip permissive signal from one terminal of the opposed terminals to other terminal thereof through the telecommunication means when the unbalanced fault detection means does not perform a relay operation but the oscillation detection means, the current change detection relay, and the close-end balanced fault detection means perform the relay operation and for giving a trip command to a circuit breaker at the one terminal when the one terminal receives a circuit breaker trip permissive signal from the other terminal.

13. The protective relay system according to claim 11, further comprising close-end balanced fault detection means for detecting a close-end balanced fault to perform a relay operation,
wherein said circuit means transmit a circuit breaker trip permissive signal from the one terminal to the other terminal through the telecommunication means when the unbalanced fault detection means does not perform a relay operation but the oscillation detection means and the current change detection relay perform a relay operation and the positive-phase-sequence relay or the close-end balanced fault detection means performs a relay operation, and for giving a trip command to a circuit breaker at the one terminal when the one terminal receives a circuit breaker trip permissive signal from the other terminal.

14. The protective relay system according to one of claims 2 and 7, further comprising delay circuit means for delaying an output signal of the negative-phase-sequence forward fault determination means by a setting time period and outputting a delayed signal when operation timing of the current change detection relay is earlier than that of the oscillation detection means.

15. The protective relay system according to one of claims 1, 2, 3, 6 and 7, further comprising:
negative-phase-sequence backward fault determination means for performing a relay operation during system faults behind one of opposed terminals to be protected, based on a relationship in phase between a negative-phase-sequence voltage and a negative-phase-sequence current which are extracted from the amount of electricity of the power system; and
delay circuit means for delaying both a transmission of the circuit breaker trip permissive signal and an output of the circuit breaker trip command upon receipt of the circuit breaker trip permissive signal when the negative-phase-sequence forward fault determination means does not perform a relay operation for not shorter than a setting time period during the relay operation of the negative-phase-sequence backward fault determination means.

16. A protective relay system comprising:
a distance relay which performs a relay operation when a distance-measuring impedance based on a voltage and a current of a power system falls within a desired operation characteristic range and gives a trip command to a circuit breaker at one terminal of opposed terminals to be protected;
oscillation detection means for detecting an oscillation of a power system to perform a relay operation, based on an amount of electricity of the power system;
circuit breaker trip blocking means for blocking the circuit breaker trip command given from the distance relay when the oscillation detection means performs the relay operation;
negative-phase-sequence forward fault determination means for performing a relay operation during system faults between opposed terminals to be protected, based on a relationship in phase between a negative-phase-sequence voltage and a negative-phase-sequence current which are extracted from a voltage and a current of the power system;
telecommunication means for transmitting/receiving a circuit breaker trip permissive signal between the opposed terminals to be protected; and
circuit means for transmitting a circuit breaker trip permissive signal from one terminal of the opposed terminals to other terminal thereof through the telecommunication means when the oscillation detection means and the negative-phase-sequence forward fault determination means perform the relay operation and for giving a trip command to a circuit breaker at the one terminal when the one terminal receives a circuit breaker trip permissive signal from the other terminal.

17. A protective relay system comprising:

a distance relay which performs a relay operation when a distance-measuring impedance based on a voltage and a current of a power system falls within a desired operation characteristic range and gives a trip command to a circuit breaker at one terminal of opposed terminals to be protected;

oscillation detection means for detecting an oscillation of a power system to perform a relay operation based on an amount of electricity of the power system;

circuit breaker trip blocking means for blocking the circuit breaker trip command given from the distance relay when the oscillation detection means performs a relay operation;

zero-phase-sequence forward fault determination means for determining a direction of a system fault between opposed terminals to be protected, based on an amount of zero-phase-sequence electricity supplied from the power system and performing a relay operation during the system fault;

telecommunication means for transmitting/receiving a circuit breaker trip permissive signal between the opposed terminals to be protected; and circuit means for transmitting a circuit breaker trip permissive signal from one terminal of the opposed terminals to other terminal thereof through the telecommunication means when the oscillation detection means and the zero-phase-sequence forward fault determination means each perform the relay operation and for giving a trip command to a circuit breaker at the one terminal when the one terminal receives a circuit breaker trip permissive signal from the other terminal.

* * * * *